United States Patent
Want et al.

(10) Patent No.: US 8,874,594 B2
(45) Date of Patent: Oct. 28, 2014

(54) SEARCH WITH MY LOCATION HISTORY

(71) Applicant: Google Inc., Mountain View, CA (US)

(72) Inventors: Roy Want, Los Altos, CA (US); William N. Schilit, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/760,941

(22) Filed: Feb. 6, 2013

(65) Prior Publication Data

US 2014/0222798 A1    Aug. 7, 2014

(51) Int. Cl.
*G06F 17/30* (2006.01)

(52) U.S. Cl.
CPC .... *G06F 17/30241* (2013.01); *G06F 17/30867* (2013.01)
USPC ........................................ 707/754

(58) Field of Classification Search
CPC ..................... G06F 17/30241; G06F 17/30029
USPC .......... 707/724, 732–734, 751, 754, 768–769
See application file for complete search history.

(56) References Cited

U.S. PATENT DOCUMENTS

| 2003/0055983 | A1* | 3/2003 | Callegari ...................... 709/227 |
| 2006/0074883 | A1  | 4/2006 | Teevan et al. |
| 2007/0100650 | A1  | 5/2007 | Ramer et al. |
| 2007/0143260 | A1  | 6/2007 | Markov et al. |
| 2010/0036807 | A1* | 2/2010 | Lieske et al. ...................... 707/3 |
| 2010/0076968 | A1  | 3/2010 | Boyns et al. |
| 2012/0158289 | A1  | 6/2012 | Bernheim Brush et al. |

OTHER PUBLICATIONS

Scott Mackenzie, Other ITA Features, Jan. 13, 2012 in Hack My Trip.*
Want, Roy et al., "An Overview of the ParcTab Ubiquitous Computing Experiment," *IEEE Personal Communications*, Dec. 1995, vol. 2. No. 6, pp. 1-31.
Schilit, William et al., "Context-Aware Computing Applications", *Workshop on Mobile Computing Systems and Applications* (WMCSA), Dec. 8-9, 1994, Santa Cruz, pp. 1-7.

* cited by examiner

*Primary Examiner* — Thu-Nguyet Le
(74) *Attorney, Agent, or Firm* — Fish & Richardson P.C.

(57) ABSTRACT

A method for incorporating information pertaining to geographic locations previously visited by a user into a search. The method includes: obtaining location information corresponding to a user account; determining, from the location information, one or more geographic locations that correspond to the location information; providing a user interface that includes a prompt that accepts search terms as input to a search query and an option to include a group of one or more geographic locations in the search query; and providing for display results related to the search terms and to one or more geographic locations in the group of one or more geographic locations when the option to include the group of one or more geographic locations is selected.

20 Claims, 7 Drawing Sheets

SEARCH WITH MY LOCATION HISTORY

BACKGROUND

During the previous decades, the amount of information and multimedia content accessible to users of computerized devices has grown astronomically with the proliferation of the Internet. Internet users can take advantage of this wealth of information to make better decisions about which restaurants to eat at, where to go on vacations, where to live, what goods and services to purchase, and numerous other facets of their lives. Additionally, multimedia content such as photos, videos, and music enriches the lives of vast numbers of Internet users. However, the expanse of information accessible on the Internet can become a problem when information that is irrelevant to a user prevents the user from easily locating relevant information.

SUMMARY

Some embodiments of the disclosure provide a method, system, and computer-readable storage medium for incorporating information pertaining to geographic locations previously visited by a user into a search. The embodiments of the present disclosure thereby facilitate the linking of search terms to the real world experiences of a user.

One implementation of the disclosure provides a method for incorporating information pertaining to geographic locations previously visited by a user into a search, the method comprising obtaining location information corresponding to a user account; determining, from the location information, one or more geographic locations that correspond to the location information; providing a user interface that includes a prompt that accepts search terms as input to a search query and an option to include a group of one or more geographic locations in the search query; and providing for display results related to search terms and to one or more geographic locations in the group of one or more geographic locations when the option to include the group of one or more geographic locations is selected; wherein the option to include the group of one or more geographic locations in the search query comprises an option to apply a filter to the one or more geographic locations that correspond to the location information.

Another implementation of the disclosure provides a computer readable storage device for incorporating information pertaining to geographic locations previously visited by a user into a search, the computer readable storage device having computer executable instructions for performing the steps of obtaining location information corresponding to a user account, determining, from the location information, a one or more geographic locations that corresponds to the location information, providing a user interface that includes a prompt that accepts search terms as input to a search query and an option to include a group of the one or more geographic locations in the search query and providing for display results related to search terms and to the one or more geographic locations in the group of one or more geographic locations when the option to include the group of one or more geographic locations is selected, wherein the option to include the group of one or more geographic locations in the search query comprises an option to apply a filter to the one or more geographic locations that correspond to the location information.

A further implementation of the disclosure provides a system for incorporating information pertaining to geographic locations previously visited by a user into a search, the system comprising a database configured to store location information associated with one or more user accounts, and a server, comprising a user interface engine configured to provide a user interface to a user, the user interface comprising a search query prompt and an option to include a group of one or more geographic locations from a set of geographic locations as an additional input into the search, wherein the option to include a group of one or more geographic locations in the search query comprises an option to apply a filter to the one or more geographic locations that correspond to the location information.

DETAILED DESCRIPTION

During the previous decades, the amount of information and multimedia content accessible to users of computerized devices has grown astronomically with the proliferation of the Internet. Internet users can take advantage of this wealth of information to make better decisions about at which restaurants to eat, where to go on vacations, where to live, what goods and services to purchase, and numerous other facets of their lives. Additionally, multimedia content such as photos, videos, and music enriches the lives of vast numbers of Internet users.

Oftentimes, the value of information or multimedia content to a given user arises from its link to that user's prior experiences in the real world. Users may derive more joy from a painting or a photograph of a place that they have visited in the real world than from a painting or photograph of a place with which they have no real-world connection. Similarly, in choosing particular goods or services to purchase, users may be able to make better decisions if they are able to link the goods or service they are considering purchasing to a previous real world experience. For example, the fact that a first restaurant is owned by the same chef who owns a second restaurant at which a user previously had an exceptional dining experience may inform the user that he or she is likely to enjoy eating at the first restaurant too.

However, it is often difficult for a user to locate information pertaining to past experiences in the real world within the virtual world of the Internet. A user may not remember enough about a past experience to be able to describe it with sufficient detail to locate information related to the past experience on the Internet. The expanse of information accessible on the Internet can become a problem when information that is irrelevant to a user prevents the user from easily locating relevant information.

Figure 1:
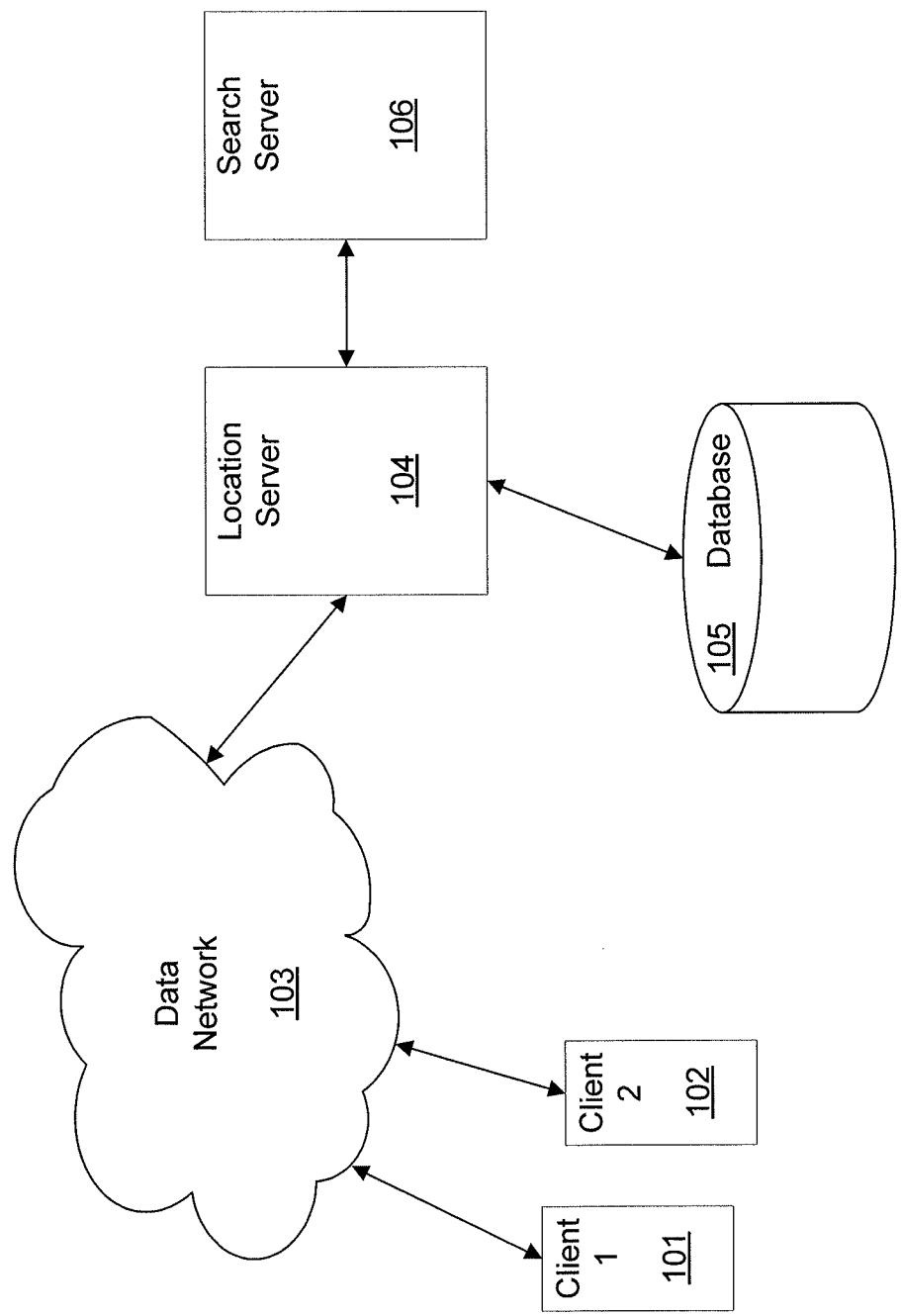
FIG. 1 is a block diagram of an example environment in which the methodology for incorporating a location history associated with a user account into a search.

FIG. 1 is a block diagram of an example communications environment in which various embodiments of the present disclosure may be implemented. In the environment depicted by FIG. 1, client devices 101 and 102 are connected to a location server 104 through a data network 103. The client devices 101 and 102 may be smart phones, tablet computers, laptop computers, desktop computers, watches with computer operating systems, personal digital assistants (PDA), video game consoles, or any one of a number of additional devices capable of accessing the Internet.

The example environment also contains a data network 103 that connects the client devices 101 and 102 to the location server 104. Data network 103 may be either a wired or a wireless network. Example networks include but are not limited to an LTE network, a GSM network, a CDMA network, a fiber optic network, or any other kind of data network. The data network 103 allows the client devices 101 and 102 to communicate with location server 104. For example, client devices 101 and 102 may transmit information to location server 104 and receive information from location server 104. Data network 103 may include a set of cell towers, as well as a set of base stations and/or mobile switching centers (MSCs). As appreciated by those skilled in the art, the data network may include various cell tower/base station/MSC arrangements. For example, a base station and a cell tower could be co-located at the same site or they could be remotely located, and a single base station could be coupled to various cell towers or various base stations could be coupled to a single MSC, to name but a few of the possible arrangements. Alternatively or in addition to the aforementioned components of data network 103, the data network 103 may include one or more IP multimedia subsystems (IMS), serving gateways (SGW), and evolved node Bs (eNB).

Location server 104 is connected to client devices 101 and 102 through data network 103. The connection enables location server 104 to both receive data from the client devices 101 and 102 and to transmit data to the client devices 101 and 102. The location server comprises processors and memory configured to receive information from a multitude of client devices, such as client devices 101 and 102. Processors and memory located at the location server 104 may further be configured to aggregate location information pertaining to a multitude of user accounts and to store the aggregated information at a database, such as database 105. The location server 104 may also identify user level locations that correspond to the location information received from client devices, such as client devices 101 and 102. Location server 104 may additionally identify subsets of user-level geographic locations that are defined by information associated with the location information that is received from client devices such as client devices 101 and 102. The location server may further be configured to provide a user interface (UI) to client devices 101 and 102 through which a client can enter a search query incorporating location information associated with a user account.

Location server 104 is also connected to database 105. Database 105 stores a variety of information, including, e.g., the information aggregated by server 104 pertaining to location information associated with a multiplicity of user accounts. Database 105 may store a variety of information pertaining to individual user accounts, including a user's email address, telephone number, social network connections, privacy settings, and numerous other fields associated with the user's online identity. Database 105 may also store location information associated with the user account. Location information associated with the user account may include information pertaining to actual real-world locations at which the user has been present in the past as well as user-level geographic locations corresponding to the actual real-world locations at which the user was present in the past. Information pertaining to actual real-world locations at which the user has been present may include one or more GPS coordinates, the signal strength of one or more wifi access points, an internet protocol (IP) address, one or more NFC tags, one or more QR codes, and one or more user-level geographic locations. User-level geographic locations may include a country, a state, a province, a territory, a county, a municipality, a township, a city, a town, a village, a neighborhood, a landmark, a point of interest, and a location name. Database 105 may also store additional contextual information linked to the location information associated with the user account. Additional contextual information linked to the location information associated with the user account may include a time or times during which the user account was linked to the geographic location, a second user-level geographic location, an event or type of event that occurred at the geographic location, the presence of an individual at a location, the presence of a member of a group at a location, location information associated with a second user account, and other information provided by an application and linked to the user account.

Search server 106 is connected to location server 104. In alternative embodiments, search server 106 and location server 104 may be the same server. Search server 106 is configured to receive a search query from location server 104. Alternatively, search server 106 may receive a search query directly from client devices 101 and 102.

Embodiments of the present disclosure provide systems and methods for incorporating previously visited real world geographic locations into a search query. A client performing a search is provided with the option to select, as additional inputs into the search query, one or more geographic locations that correspond to locations linked to a user account. The search interface provides the opportunity to select, from a list of user-level geographic locations linked to a particular user account, one or more user-level geographic locations on an individual basis, the entire list of user-level geographic locations, or a subset of user-level geographic locations where the subset is defined based upon information linked to the user account and associated with the location. For example, a subset may be defined based on the date and time at which the geographic location became linked to the user account. Results provided by the search relate simultaneously to the search query entered by the client and the user-level geographic locations selected by the client.

The user-level geographic locations corresponding to locations linked to an account can be obtained from actual real-world locations at which a client device associated with the account or a user associated with the account has been present.

In some embodiments of the disclosure, actual real-world locations are recorded by an application running on a client device such as a smart phone or tablet computer. For example, a client device with GPS functionality can identify its current location in terms of GPS coordinates. Alternatively, a client device with wifi capability can detect wifi access points and approximate its location to be approximately that of an accessible wifi access point with a known real-world location. The wifi-capable device can also determine its approximate distance from multiple wifi access points by measuring the strength of the signals received from each access point. Triangulation methods and the known locations of the access points can then be used to determine the precise geographic location of the wifi-capable device. Devices may also identify their current location as that corresponding to a QR code or NFC tag that was scanned by the device. Once such an application running on the client device has ascertained an actual real-world location at which the device is located, or alternatively, ascertained information that may be used to identify an actual real-world location, the application can transmit the location itself or the information potentially indicative of a location to a server. The server can then associate the information with a particular user account, and the information can be stored at a database.

Alternatively, an actual real-world location can be associated with a particular user account if a client accesses the particular user account from a known geographic location. For example, if an account is accessed by a machine with a particular IP address, and the IP address is associated with a particular geographic location, the geographic location associated with the IP address can be associated with the user account. In addition, a client can provide a geographic location to be associated with a user account when information indicating the user was present at a particular real-world location is manually input into the user account. For example, a client may provide information indicating that a user was present at Mount Rushmore.

Once identified, actual real-world locations, such as a particular set of GPS coordinates, can be mapped to user-level geographic locations, such as a particular neighborhood, city, county, state, province, or country. Other official terms for real-world locations or unofficial terms commonly used by residents or travelers to refer to a geographic place may also be provided as user-level geographic locations. For example, if a client device associated with an account acquires GPS coordinates and the coordinates are determined to be within the city limits of Mountain View, the user-level geographic location of Mountain View is identified as a location at which the client device has been present. Furthermore, multiple granularities of user-level geographic locations may be provided. For example, if an actual real-world location within the Hyde Park neighborhood in the city of Chicago is linked to the user account, the user-level geographic locations of USA, Illinois, Cook County, Chicago, South Chicago, and Hyde Park may be linked to the user account as well.

In some embodiments of the disclosure, both actual real-world locations and user-level geographic locations are linked to a user account. In other embodiments, actual real-world locations are not linked to user accounts. Instead, actual real-world locations are translated to one or more granularities of user-level geographic locations and only the user-level geographic locations are linked to the account. In still other embodiments, only the actual real-world locations are stored at the user account and user-level geographic locations are identified on a transient basis during the execution of the methods and systems that constitute such embodiments.

Some embodiments of the present disclosure associate additional contextual information to the actual real-world locations, to the user-level geographic locations, or to both. Such additional contextual information may be stored at the user account or at another location linked to the account. Such contextual information may include but is not limited to the time or times at which a user of the account or client device associated with the account was present at a particular location, the identities of one or more individuals who were simultaneously present at the location with the user or client device, the weather of the geographic location during the time or times at which the user or client device was present there, and the identities of events that were ongoing at the location during the time or times during which the user or client device was present. Contextual information associated with the location information may be used to allow the client to select a subset of user-level geographic locations to include in the search. For example, if the location information includes the time at which a user of the account or client device associated with the account was present in one or more locations, the client could restrict the search to include only those locations at which he or she was present during a particular time window. Similarly, if the location information includes information pertaining to events ongoing while the user of the account or device associated with the account was present in one or more locations, the client can restrict the search to include only locations at which presence was simultaneous with a particular event or event type.

Furthermore, results can be weighted according to frequency or intensity information if the location information includes the frequency with which a user of the account or client device associated with the account was present at one or more locations or the level of activity initiated by the user or client device associated with the account at one or more locations. For example, if the user has visited one user-level geographic location more frequently than a second user-level geographic location that is also selected as an input into the search query, the results related to the more frequently visited user-level geographic location may be deemed to be more relevant than those related to the less frequently visited user-level geographic location. Alternatively, results may be weighted in the opposite fashion such that the less-frequently visited location may be weighted more heavily. Similarly, if a large amount of activity originating from the user of the client device associated with the user account is detected at a particular location, that location may be weighted either more or less heavily than locations where less activity is detected.

Figure 2:
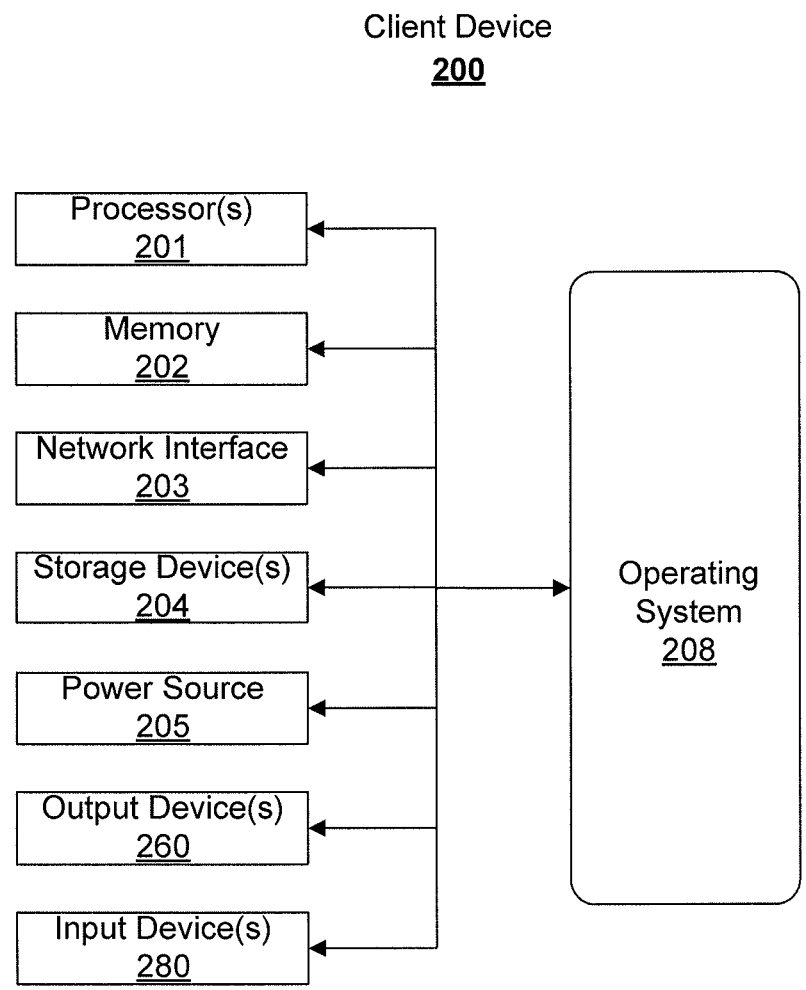
FIG. 2 is a block diagram of basic functional components for one of the client devices in FIG. 1, according to one aspect of the disclosure.

Turning now to FIG. 2, a block diagram of basic functional components for one of the client devices in FIG. 1, according to one aspect of the disclosure, is illustrated. In general, many other embodiments of the client device 200 may be used as long as the embodiment is capable of establishing a connection with a peripheral device. In the illustrated embodiment of FIG. 2, the client device 200 includes one or more processors 201, memory 202, a network interface 203, one or more storage devices 204, power source 205, one or more output devices 260, and one or more input devices 280. The client device 200 also includes an operating system 208 that is executable by the client. In a conventional fashion, each of components 201, 202, 203, 204, 205, 260, 280, and 208 are interconnected physically, communicatively, and/or operatively for inter-component communications.

As illustrated, processors 201 are configured to implement functionality and/or process instructions for execution within client device 200. For example, processors 201 execute instructions stored in memory 202 or instructions stored on storage devices 204. Memory 202, which may be a non-transient, computer-readable storage medium, is configured to store information within client device 200 during operation. In some embodiments, memory 202 includes a temporary memory, area for information not to be maintained when the client device 200 is turned off. Examples of such temporary memory include volatile memories such as random access memories (RAM), dynamic random access memories (DRAM), and static random access memories (SRAM). Memory 202 also maintains program instructions for execution by the processors 201.

Storage devices 204 also include one or more non-transient computer-readable storage media. Storage devices 204 are generally configured to store larger amounts of information than memory 202. Storage devices 204 may further be configured for long-term storage of information. In some examples, storage devices 204 include non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

The client device 200 uses network interface 203 to communicate with external devices via one or more networks, such as the data network 103 of FIG. 1, one or more wireless networks, wired networks, fiber optics networks, and other types of networks through which a communication with the client device 200 may be established. Network interface 203 may be a network interface card, such as an Ethernet card, an optical transceiver, a radio frequency transceiver, or any other type of device that can send and receive information. Other non-limiting examples of network interfaces include Bluetooth®, 3G and WiFi® radios in mobile computing devices, and USB. In some embodiments, the UE 200 uses network interface 203 to wirelessly communicate with an external device such as one or more services used by the communication routing service 104 of FIG. 1, a mobile phone, or other networked computing devices.

The client device 200 includes one or more input devices 280. Input devices 280 are configured to receive input from a user through tactile, audio, and/or video feedback. Non-limiting examples of input device 280 include a presence-sensitive screen, a mouse, a keyboard, a voice responsive system, video camera, microphone or any other type of device for detecting a command from a user. In some examples, a presence-sensitive screen includes a touch-sensitive screen.

One or more output devices 260 are also included in client device 200. Output devices 260 are configured to provide output to a user using tactile, audio, and/or video stimuli. Output device 260 may include a display screen (part of the presence-sensitive screen), a sound card, a video graphics adapter card, or any other type of device for converting a signal into an appropriate form understandable to humans or machines. Additional examples of output device 260 include a speaker, a cathode ray tube (CRT) monitor, a liquid crystal display (LCD), or any other type of device that can generate intelligible output to a user.

The client device 200 includes one or more power sources 205 to provide power to the client. Non-limiting examples of power source 205 include single-use power sources, rechargeable power sources, and/or power sources developed from nickel-cadmium, lithium-ion, or other suitable material.

The client device 200 includes an operating system 208 such as the Android® operating system. The operating system 208 controls operations of the components of the client device 200. For example, the operating system 208 facilitates the interaction of processors 201, memory 202, network interface 203, storage device(s) 204, input device 280, output device 260, and power source 205.

Figure 3:
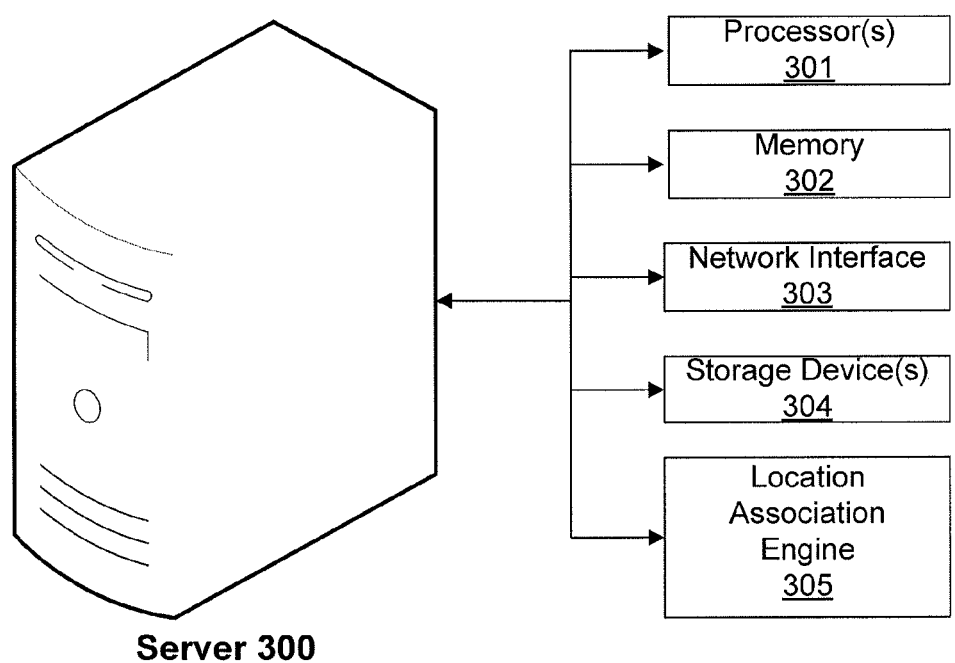
FIG. 3 is a block diagram of basic functional components for the location server in FIG. 1, according to one aspect of the disclosure.

Moving to FIG. 3, a block diagram of basic functional components for a server 300, according to one aspect of the disclosure, is depicted. The server 300 includes one or more processors 301, memory 302, a network interface 303, one or more storage devices 304, and a location association engine 305. In a conventional fashion, each of components 301, 302, 303, 304, and 305 are interconnected physically, communicatively, and/or operatively for inter-component communications.

As illustrated, processors 301 are configured to implement functionality and/or process instructions for execution within server 300. For example, processors 301 execute instructions stored in memory 302 or instructions stored on storage devices 304. Memory 302, which may be a non-transient, computer-readable storage medium, is configured to store information within server 300 during operation. In some embodiments, memory 302 includes a temporary memory, i.e. an area for information not to be maintained when the server 300 is turned off. Examples of such temporary memory include volatile memories such as random access memories (RAM), dynamic random access memories (DRAM), and static random access memories (SRAM). Memory 302 also maintains program instructions for execution by the processors 301.

Storage devices 304 also include one or more non-transient computer-readable storage media. Storage devices 304 are generally configured to store larger amounts of information than memory 302. Storage devices 304 may further be configured for long-term storage of information. In some examples, storage devices 304 include non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

The server 300 uses network interface 303 to communicate with external devices via one or more networks, such as the data network 103 of FIG. 1. Such networks may include one or more wireless networks, wired networks, fiber optics networks, and other types of networks through which communication between the server 300 and an external device may be established. Network interface 303 may be a network interface card, such as an Ethernet card, an optical transceiver, a radio frequency transceiver, or any other type of device that can send and receive information.

The location association engine 305 includes program instructions and/or data that are executable by the server 300. The program instructions and data included in the location association engine 305 includes instructions to receive and aggregate location data received by the server 300 from a client device, such as client device 101, and to store such data at storage devices 304, at memory 302, and/or at an external database, such as database 105. The program instructions and data further include instructions for associating the location information with a user account. The user account may be stored at an external database, such as database 105, at storage devices 304 or at memory 302. The program instructions may further include instructions for mapping actual real-world location information or information corresponding to an actual real-world geographic location to one or more user-level geographic locations. Such instructions may rely upon data pertaining to both actual real-world locations and user-level geographic locations and may be stored at an external database, such as database 105, at storage devices 304 or at memory 302.

Figure 4:
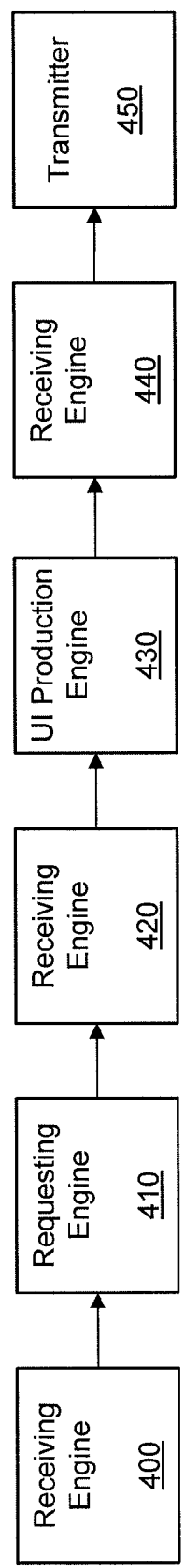
FIG. 4 is a block diagram of the various states of a processor within a server during the process of incorporating a location history associated with a user account into a search, according to one aspect of the disclosure.

FIG. 4 is a block diagram of the various states of a processor within a server during the process of incorporating a location history associated with a user account into a search, according to one aspect of the disclosure. At 400, the processors 301 of server 300 are configured as a receiving engine.

The receiving engine is configured to receive a request to perform a search incorporating location history. The request may originate at a client device, such as client devices 101 or 102.

At 410, the processors 301 of server 300 are configured as a requesting engine. The requesting engine queries a database, such as database 105, for information associated with the request received at 400. The information associated with the request may include a user account identity, user account information, location information associated with the user account, and additional contextual information linked to the location information associated with the user account. User account information may include a user's email address, telephone number, social network connections, privacy settings, and numerous other fields associated with the user's online identity. Location information associated with the user account may include information pertaining to actual real-world locations at which the user has been present in the past as well as user-level geographic locations corresponding to the actual real-world locations at which the user was present in the past. Information pertaining to actual real-world locations at which the user has been present may include one or more GPS coordinates, the signal strength of one or more wifi access points, an internet protocol (IP) address, one or more NFC tags, one or more QR codes, and one or more user-level geographic locations. User-level geographic locations may include a country, a state, a province, a territory, a county, a municipality, a township, a city, a town, a village, a neighborhood, a landmark, a point of interest, and a location name. Additional contextual information linked to the location information associated with the user account may include a time or times during which the user account was linked to the geographic location, a second user-level geographic location, an event or type of event that occurred at the geographic location, the presence of an individual at a location, the presence of a member of a group at a location, location information associated with a second user account, and other information provided by an application and linked to the user account.

At 420, the processors 301 of server 300 are configured as a receiving engine. At 420, the receiving engine is configured to receive information including but not limited to a user account identity, user account information, location information associated with the user account, and additional contextual information linked to the location information associated with the user account.

At 430, the processors 301 of server 300 are configured as a user interface (UI) production engine. The UI production engine creates a UI that includes but is not limited to a prompt that accepts search terms as inputs to a search query and an option to include user-level geographic locations in the search query. The option to include user-level geographic locations in the search query may include an option to apply a filter to the one or more geographic locations that correspond to the location information. The option to apply a filter to the one or more geographic locations that correspond to the location information may include but is not limited to an option to individually select one or more user-level geographic locations linked to the user account, an option to select a subset of the set of user-level geographic locations where the composition of the subset is determined by contextual information associated with the user-level geographic locations linked to the user account, and an option to select the entire set of user-level geographic locations linked to the user account. The options to individually select one or more user-level geographic locations, to select a subset of the set of user-level geographic locations, and the option to select the entire set of user-level geographic locations may be provided by buttons in the UI. The option to select a subset of the set of user-level geographic locations where the subset is determined by contextual information associated with the user-level geographic locations may include but is not limited to an option to select a category of user-level geographic locations where the category is defined by granularity, an option to select a group of user-level geographic locations at which the user was present during a particular period of time, an option to select a group of user-level geographic locations at which another user had previously been present, and an option to select a group of user-level geographic locations at which one or more members of a group had previously been present.

At 440, the processors 301 of server 300 are configured as a receiving engine. At 440, the receiving engine is configured to receive a search query. The search query may originate from a client device, such as client devices 101 and 102, and may be entered at the UI produced at 430. At 450, the processors 301 of server 300 are configured as a transmitter. The transmitter is configured to transmit the search request to a search server.

Figure 5:
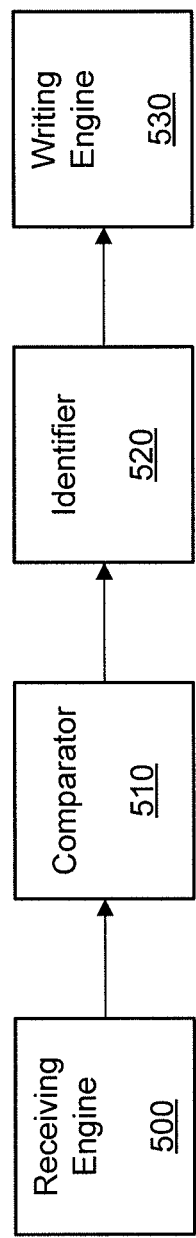
FIG. 5 is a block diagram of the various states of a processor within a server during the process of associating geographic locations, both actual and user-level, with a user account, according to one aspect of the disclosure.

FIG. 5 is a block diagram of the various states of a processor within a server during the process of associating geographic locations, both actual and user-level, with a user account, according to one aspect of the disclosure. At 500, the processors 301 of server 300 are configured as a receiving engine. At 500, the receiving engine is configured to receive an actual real world geographic location or information corresponding to an actual real world geographic location from a client device, such as client device 101 or 102. The actual real world geographic location or information corresponding to an actual real world geographic location may include but is not limited to one or more GPS coordinates, the signal strength of one or more wifi access points, an internet protocol (IP) address, one or more NFC tags, one or more QR codes, and one or more user-level geographic locations. User-level geographic locations include but are not limited to a country, a state, a province, a territory, a county, a municipality, a township, a city, a town, a village, a neighborhood, a landmark, a point of interest, and a location name.

At 510, the processors 301 of server 300 are configured as a comparator. At 510, the comparator compares the actual real world geographic location or the information corresponding to an actual real world geographic location with data pertaining to user-level geographic locations. At 520, the processors of server 300 are configured as an identifier. At 520, the identifier identifies user-level geographic locations corresponding to the actual real world geographic locations indicated by the information received at 500. At 530, the processors of server 300 are configured as a writing engine. At 530, the writing engine writes the user-level geographic location information identified at 520 to a user account. Alternatively, the writing engine writes the user-level geographic location information to a memory address that is not part of the user account but which is linked to the user account.

Figure 6:
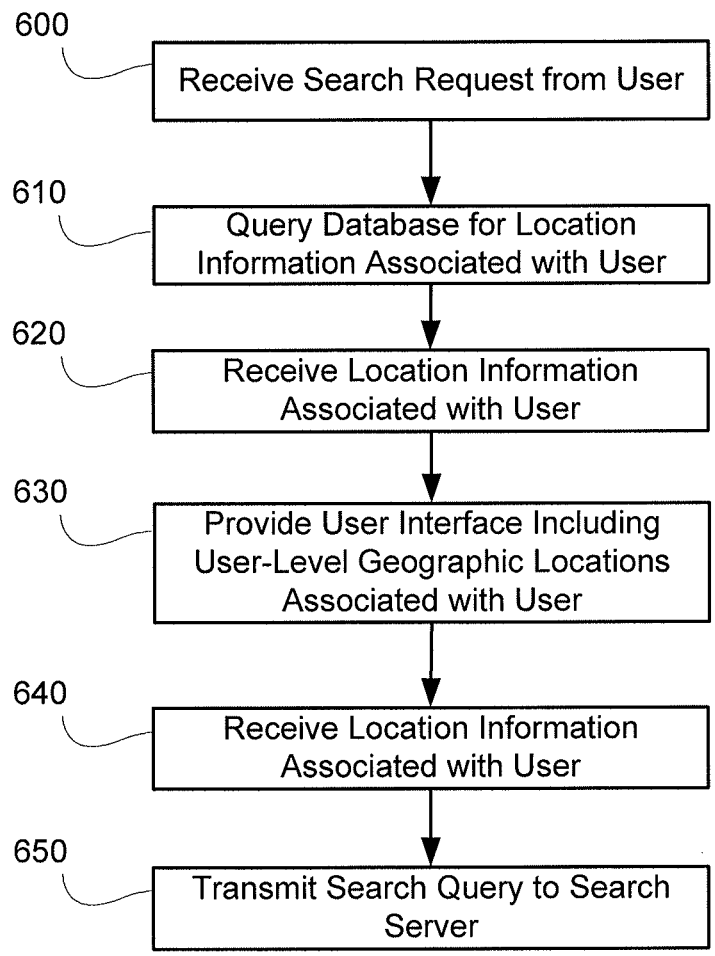
FIG. 6 is a flow diagram illustrating an example method for incorporating a location history associated with a user account into a search, according to one aspect of the disclosure.

FIG. 6 is a flow diagram illustrating an example method for incorporating a location history associated with a user account into a search, according to one aspect of the disclosure. At 600, a request to perform a search incorporating location information associated with a user account is received by a server. The search request may originate from a client device, such as client device 101 or client device 102.

At 610, a query requesting location information associated with a user account is sent to a database. The location information requested from the database may include but is not limited to user account information, location information associated with the user account, and additional contextual information linked to the location information associated with the user account. User account information may include a user's email address, telephone number, social network connections, privacy settings, and numerous other fields associated with the user's online identity. Location information associated with the user account may include information pertaining to actual real-world locations at which the user has been present in the past as well as user-level geographic locations corresponding to the actual real-world locations at which the user was present in the past. Information pertaining to actual real-world locations at which the user has been present may include one or more GPS coordinates, the signal strength of one or more wifi access points, an internet protocol (IP) address, one or more NFC tags, one or more QR codes, and one or more user-level geographic locations. User-level geographic locations may include a country, a state, a province, a territory, a county, a municipality, a township, a city, a town, a village, a neighborhood, a landmark, a point of interest, and a location name. Additional contextual information linked to the location information associated with the user account may include a time or times during which the user account was linked to the geographic location, a second user-level geographic location, an event or type of event that occurred at the geographic location, the presence of an individual at a location, the presence of a member of a group at a location, location information associated with a second user account, and other information provided by an application and linked to the user account.

At 620, location information associated with the user account is received from the database. At 630, a user interface (UI) including the option to select one or more user-level geographic locations associated with the user account is provided to a client device, such as client device 101 or 102. The UI may include but is not limited to a prompt that accepts search terms as inputs to a search query and an option to include user-level geographic locations in the search query. The option to include user-level geographic locations in the search query may include an option to apply a filter to the one or more geographic locations that correspond to the location information. The option to apply a filter to the one or more geographic locations that correspond to the location information may include but is not limited to an option to individually select one or more user-level geographic locations linked to the user account, an option to select a subset of the set of user-level geographic locations where the composition of the subset is determined by contextual information associated with the user-level geographic locations linked to the user account, and an option to select the entire set of user-level geographic locations linked to the user account. The options to individually select one or more user-level geographic locations, to select a subset of the set of user-level geographic locations, and the option to select the entire set of user-level geographic locations may be provided by buttons in the UI. The option to select a subset of the set of user-level geographic locations where the subset is determined by contextual information associated with the user-level geographic locations may include but is not limited to an option to select a category of user-level geographic locations where the category is defined by granularity, an option to select a group of user-level geographic locations at which the user was present during a particular period of time, an option to select a group of user-level geographic locations at which another user had previously been present, and an option to select a group of user-level geographic locations at which one or more members of a group had previously been present.

At 640, a search query including location information associated with the user account is received from a client device, such as client device 101 or 102. At 650, the search query is transmitted to a search server. In alternative embodiments, the search server and the server receiving the request to perform a search incorporating location information associated with a user account may be the same server.

Figure 7:
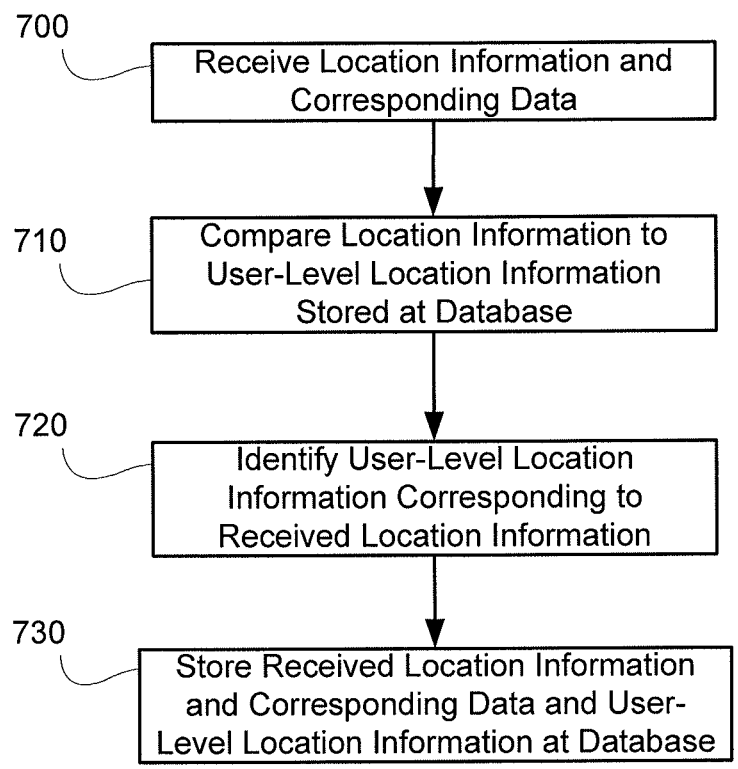
FIG. 7 is a flow diagram illustrating an example method for associating geographic locations, both actual and user-level, with a user account, according to one aspect of the disclosure.

FIG. 7 is a flow diagram illustrating an example method for associating geographic locations, both actual and user-level, with a user account, according to one aspect of the disclosure. At 700, location information and corresponding data are received at a server, such as location server 104, from a client device, such as client device 101 or 102. Location information may include actual real world geographic location or information corresponding to an actual real world geographic location. The actual real world geographic location or information corresponding to an actual real world geographic location may include but is not limited to one or more GPS coordinates, the signal strength of one or more wifi access points, an internet protocol (IP) address, one or more NFC tags, one or more QR codes, and one or more user-level geographic locations. User-level geographic locations include but are not limited to a country, a state, a province, a territory, a county, a municipality, a township, a city, a town, a village, a neighborhood, a landmark, a point of interest, and a location name.

At 710, location information received at 700 is compared to information pertaining to user-level geographic locations. At 720, one or more user-level geographic locations are identified that correspond to the location information received at 700. At 730, the one or more user-level geographic locations identified at 720 are stored at a user account along with data corresponding to the location information that was received at 700. Additionally, the location information received at 700 may also be stored at the user account in some embodiments. In other embodiments, the location information may be stored at a memory address separate from the user account but associated with or linked to the user account.

In the example embodiments, the various applications can be configured on any distributed or embedded platform within a single physical location or multiple locations. Similarly, some of the resources may reside on individual and separate platforms or they may be embedded into the server or other platforms. As such, embodiments contemplate that applications, resources, managers, servers, etc. may be joined or separated without diverging from their identities and functions. For example, a "server system" may include a single server platform or multiple server platforms.

All references, including publications, patent applications, and patents, cited herein are hereby incorporated by reference to the same extent as if each reference were individually and specifically indicated to be incorporated by reference and were set forth in its entirety herein.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to retrieve content (i.e., recorded voicemails) from a content server (i.e., a voicemail server). In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as, for example, to a city, ZIP code, or state level), so that a particular location of a user cannot be determined. Thus, the user may have control over how information is collected about him or her and used by the systems discussed herein.

The use of the terms "a" and "an" and "the" and "at least one" and similar referents in the context of describing the disclosed subject matter (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or example language (e.g., "such as") provided herein, is intended merely to better illuminate the disclosed subject matter and does not pose a limitation on the scope of the disclosure unless otherwise claimed. No language in the specification should be construed as indicating any non-claimed element as essential to the practice of the disclosure.

Variations of the embodiments disclosed herein may become apparent to those of ordinary skill in the art upon reading the foregoing description. Skilled artisans may employ such variations as appropriate, and the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A method comprising:
   obtaining a set of location information data entries stored at a computer-readable memory location and affiliated with a user account, wherein each location information data entry includes data indicative of a location acquired by a client device associated with the user account as a result of the client device being present at the location;
   determining a set of geographic locations, wherein each geographic location in the set of geographic locations corresponds to at least one location information data entry in the set of location information data entries;
   providing a user interface that includes a prompt that accepts search terms from the client device associated with the user account as input to a search query and an interface component for including an indication of at least one geographic location as input to the search query;
   transmitting the search query to a search engine; and
   providing, for display, results provided by the search engine in response to the search query;
   wherein the interface component for including an indication of at least one geographic location as input to the search query comprises an option to apply a filter to the set of geographic locations and include the geographic locations that pass the filter as input to the search query, and
   wherein the option to apply the filter to the set of geographic locations includes one or more of:
   an option to select a subset of the set of geographic locations, wherein the subset is determined through data associated with the set of location information data entries, and wherein the subset of the set of geographic locations includes the geographic locations at which the client device was present during a particular period of time, and
   an option to select the entire set of geographic locations.

2. The method of claim 1, wherein the interface component further comprises an option to individually select one or more geographic locations from the set of geographic locations and include the individually selected geographic locations in the search query.

3. The method of claim 1, further comprising:
   receiving a set of contextual information data entries associated with the set of location information data entries; and
   linking each entry of the set of contextual information data entries to an entry of the set of location information data entries.

4. The method of claim 1, wherein the determining a set of geographic locations wherein each geographic location in the set of geographic locations corresponds to at least one location information data entry in the set of location information data entries comprises:
   identifying a set of location information data entries;
   identifying, for each entry in the set of location information data entries, one or more geographic locations corresponding to the location information data entry; and
   generating the set of geographic locations wherein each geographic location in the set corresponds to at least one entry in the set of location information data entries.

5. The method of claim 1, wherein the set of location information data entries includes at least one of: one or more global positioning system (GPS) coordinates, the signal strength of one or more wifi access points, an internet protocol (IP) address, one or more near field communication (NFC) tags, one or more quick response (QR) codes, and one or more geographic locations.

6. The method of claim 1, wherein geographic locations include at least one of: a country, a state, a province, a territory, a county, a municipality, a township, a city, a town, a village, a neighborhood, a landmark, a point of interest, and a location name.

7. The method of claim 1, wherein the data associated with the set of location information data entries that determines the composition of the subset includes data that represents at least one of: a time, a second geographic location, an event, the presence of an individual, the presence of a member of a group, location information associated with a second user, information provided by an application, a granularity of geographic location, and a category of geographic location.

8. The method of claim 1, wherein the option to select a subset of the set of geographic locations includes at least one of:
   an option to select a category of geographic locations as a subset,
   an option to select a subset of geographic locations at which the user was present during a particular period of time,
   an option to select a subset of geographic locations at which another user had previously been present, and an option to select a subset of geographic locations at which one or more members of a group had previously been present.

9. A computer readable storage device having computer executable instructions for performing the steps of:
obtaining a set of location information data entries stored at a computer readable memory location and affiliated with a user account wherein each location information data entry includes data indicative of a location acquired by a client device associated with the user account as a result of the client device being present at the location;
determining a set of one or more geographic locations, wherein each geographic location in the set of geographic locations corresponds to at least one location information data entry in the set of location information data entries;
providing a user interface that includes a prompt that accepts search terms from the client device associated with the user account as input to a search query and an interface component for including an indication of at least one geographic location as input to the search query;
transmitting the search query to a search engine; and
providing for display results provided by the search engine in response to the search query;
wherein the interface component for including an indication of at least one geographic location as input to the search query comprises an option to apply a filter to the set of geographic locations and include the geographic locations that pass the filter as input to the search query, and
wherein the option to apply the filter to the set of geographic locations includes one or more of:
an option to select a subset of the set of geographic locations, wherein the subset is determined through data associated with the set of location information data entries, and wherein the subset of the set of geographic locations includes the geographic locations at which the client device was present during a particular period of time, and
an option to select the entire set of geographic locations.

10. The computer readable storage device of claim 9, wherein the interface component further comprises
an option to individually select one or more geographic locations from the set of geographic locations and include the individually selected geographic locations in the search query.

11. The computer readable storage device of claim 9 having computer executable instructions for performing the steps of:
receiving a set of contextual information data entries associated with the set of location information data entries; and
linking each entry of the set of contextual information data entries to an entry of the set of location information data entries.

12. The computer readable storage device of claim 9, wherein the instructions for determining a set of geographic locations wherein each geographic location in the set of geographic locations corresponds to at least one location information data entry in the set of location information data entries comprise instructions for:
identifying a set of location information data entries;
identifying, for each entry in the set of location information data entries, one or more geographic locations corresponding to the location information data entry; and
generating the set of geographic locations wherein each geographic location in the set corresponds to at least one entry in the set of location information data entries.

13. The computer readable storage device of claim 9, wherein the set of location information data entries includes at least one of: one or more global positioning system (GPS) coordinates, the signal strength of one or more wifi access points, an internet protocol (IP) address, one or more near field communication (NFC) tags, one or more quick response (QR) codes, and one or more geographic locations.

14. The computer readable storage device of claim 9, wherein geographic locations include at least one of: a country, a state, a province, a territory, a county, a municipality, a township, a city, a town, a village, a neighborhood, a landmark, a point of interest, and a location name.

15. The computer readable storage device of claim 9, wherein the data associated with the set of location information entries that determines the composition of the subset includes data that represents at least one of: a time, a geographic location, an event, the presence of an individual, the presence of a member of a group, location information associated with a second user, information provided by an application, a granularity of geographic location, and a category of geographic location.

16. The computer readable storage device of claim 9, wherein the option to select a subset of the set of geographic locations includes at least one of: an option to select a category of geographic locations as a subset, an option to select a subset of geographic locations at which the user was present during a particular period of time, an option to select a subset of geographic locations at which another user had previously been present, and an option to select a subset of geographic locations at which one or more members of a group had previously been present.

17. A system comprising:
a database comprising a computer readable storage medium configured to store sets of location information data entries associated with a user account wherein each location information data entry includes data indicative of a geographic location acquired by a client device associated with the user account as a result of the client device being present at the geographic location; and
a server, comprising a user interface engine configured to provide a user interface to a user, the user interface comprising a prompt that accepts search terms from the client device associated with the user account as input to a search query and an interface component for including an indication of a geographic location as input to the search query;
wherein the interface component for including an indication of at least one geographic location as input to the search query comprises an option to apply a filter to a set of geographic locations and include the geographic locations that pass the filter as input to the search query, wherein each geographic location in the set of geographic locations corresponds to at least one location information data entry in a set of location information data entries affiliated with a user account, and
wherein the option to apply the filter to the set of geographic locations includes one or more of:
an option to select a subset of the set of geographic locations, wherein the subset is determined through data associated with the set of location information data entries, and wherein the subset of the set of geographic locations includes the geographic locations at which the client device was present during a particular period of time, and
an option to select the entire set of geographic locations.

18. The system of claim 17, wherein the interface component further comprises an option to individually select one or more geographic locations from the set of geographic locations.

19. The system of claim 17, wherein the data associated with the set of location information data entries affiliated with the user account that determines the composition of the subset includes data entries representative of at least one of: a time, a geographic location, an event, the presence of an individual, the presence of a member of a group, location information data associated with a second user, and information provided by an application.

20. The system of claim 17, wherein the option to select a subset of the set of geographic locations includes at least one of: an option to select a category of geographic locations, an option to select a subset of geographic locations at which the user was present during a particular period of time, an option to select a subset of geographic locations at which another user had previously been present, and an option to select a subset of geographic locations at which one or more members of a group had previously been present.

\* \* \* \* \*